US012698423B2

(12) United States Patent
Ueda et al.

(10) Patent No.: US 12,698,423 B2
(45) Date of Patent: Aug. 4, 2026

(54) OPTICAL BONDING PARTICLES, ADHESIVE, AND DISPLAY DEVICE

(71) Applicant: SEKISUI CHEMICAL CO., LTD., Osaka (JP)

(72) Inventors: Saori Ueda, Osaka (JP); Takashi Fukuda, Osaka (JP); Yasuyuki Yamada, Osaka (JP); Takeshi Wakiya, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 1148 days.

(21) Appl. No.: 17/768,930

(22) PCT Filed: Oct. 15, 2020

(86) PCT No.: PCT/JP2020/038872
§ 371 (c)(1),
(2) Date: Apr. 14, 2022

(87) PCT Pub. No.: WO2021/075483
PCT Pub. Date: Apr. 22, 2021

(65) Prior Publication Data
US 2023/0323163 A1 Oct. 12, 2023

(30) Foreign Application Priority Data
Oct. 15, 2019 (JP) ................................ 2019-188694
Aug. 12, 2020 (JP) ................................ 2020-136153

(51) Int. Cl.
*C09J 11/08* (2006.01)
*C08K 9/06* (2006.01)
*C09J 183/04* (2006.01)

(52) U.S. Cl.
CPC ................ *C09J 11/08* (2013.01); *C08K 9/06* (2013.01); *C09J 183/04* (2013.01)

(58) Field of Classification Search
CPC ........................................................ C09J 11/08
See application file for complete search history.

(56) References Cited

U.S. PATENT DOCUMENTS

2002/0012085 A1* 1/2002 Honda ................ G02B 5/0278 349/112
2006/0058440 A1 3/2006 Morita et al.
(Continued)

FOREIGN PATENT DOCUMENTS

DE 102015205132 9/2016
EP 3375808 9/2018
(Continued)

OTHER PUBLICATIONS

English machine translation of Uenoyama et al. (JP 2014-225441) (Year: 2014).*
(Continued)

*Primary Examiner* — Michael F Pepitone
(74) *Attorney, Agent, or Firm* — Wenderoth, Lind & Ponack, L.L.P.

(57) ABSTRACT

There are provided optical bonding particles capable of improving the visibility and controlling gaps with high accuracy. The optical bonding particles according to the present invention include silicone particles and coating particles or a coating layer disposed on the surface of the silicone particles, and in the optical bonding particles, the absolute value of the difference between the refractive index of the silicone particles and the refractive index of the coating particles or the refractive index of the coating layer is 0.03 or less.

10 Claims, 4 Drawing Sheets

(56) References Cited

U.S. PATENT DOCUMENTS

| | | | |
|---|---|---|---|
| 2012/0146482 | A1 | 6/2012 | Yeom et al. |
| 2013/0040144 | A1 | 2/2013 | Inokuchi et al. |
| 2022/0073684 | A1 | 3/2022 | Wakita et al. |

FOREIGN PATENT DOCUMENTS

| | | | | | |
|---|---|---|---|---|---|
| EP | 3904427 | | | 12/2019 | |
| EP | 4047064 | | | 8/2022 | |
| JP | H10323944 | A | * | 12/1998 | |
| JP | 2010-190936 | | | 9/2010 | |
| JP | 2010-228153 | | | 10/2010 | |
| JP | 2012-128421 | | | 7/2012 | |
| JP | 2013-40241 | | | 2/2013 | |
| JP | 2013-54382 | | | 3/2013 | |
| JP | 2013208897 | A | * | 10/2013 | ............... B32B 7/02 |
| JP | 2014225441 | A | * | 12/2014 | |
| WO | WO-2008010553 | A1 | * | 1/2008 | ............. C08K 5/005 |
| WO | 2020/137913 | | | 7/2020 | |

OTHER PUBLICATIONS

English machine translation of Chung et al. (JP 2013-208897) (Year: 2013).*

Tanaka et al. (JP 10-323944) English machine translation. (Year: 1998).*

Watanabe et al. (WO 2008/010553) English machine translation. (Year: 2008).*

International Preliminary Report on Patentability and Written Opinion of the International Searching Authority issued Apr. 19, 2022 in International (PCT) Application No. PCT/JP2020/038872.

Extended European search report issued Sep. 20, 2023 in corresponding European Patent Application No. 20877710.2.

International Search Report (ISR) issued Dec. 28, 2020 in International (PCT) Application No. PCT/JP2020/038872.

* cited by examiner

[FIG. 1.]
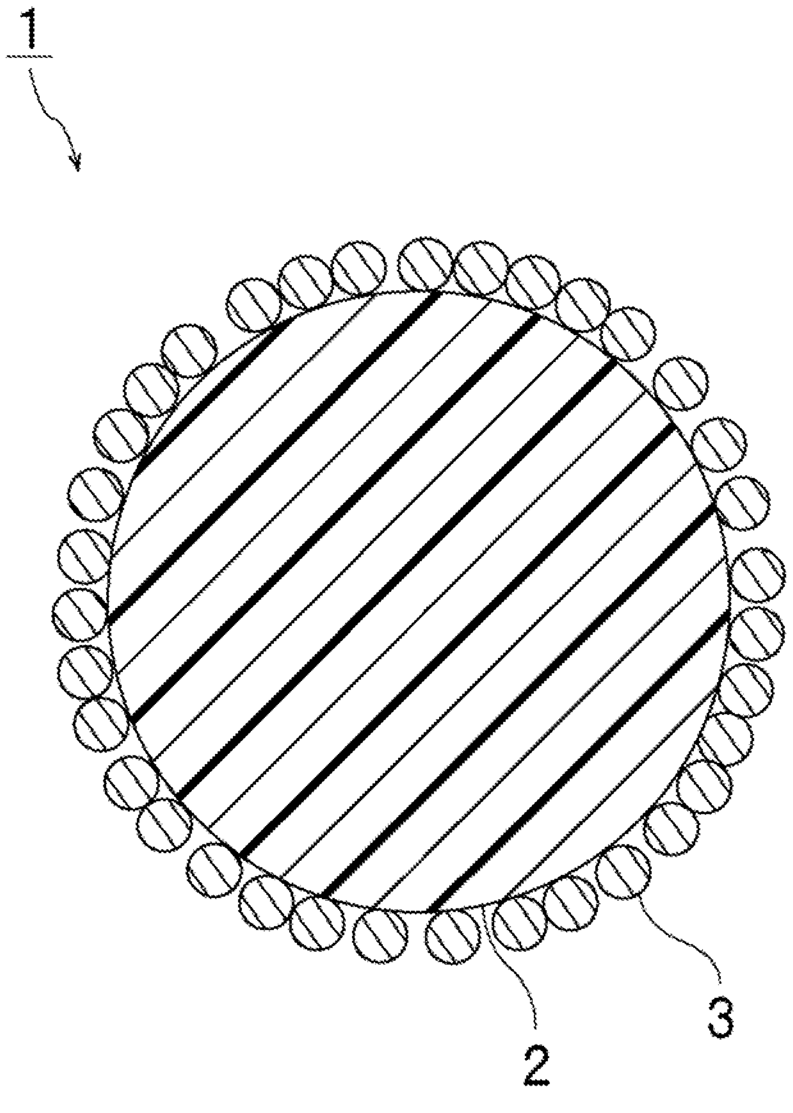

[FIG. 2.]
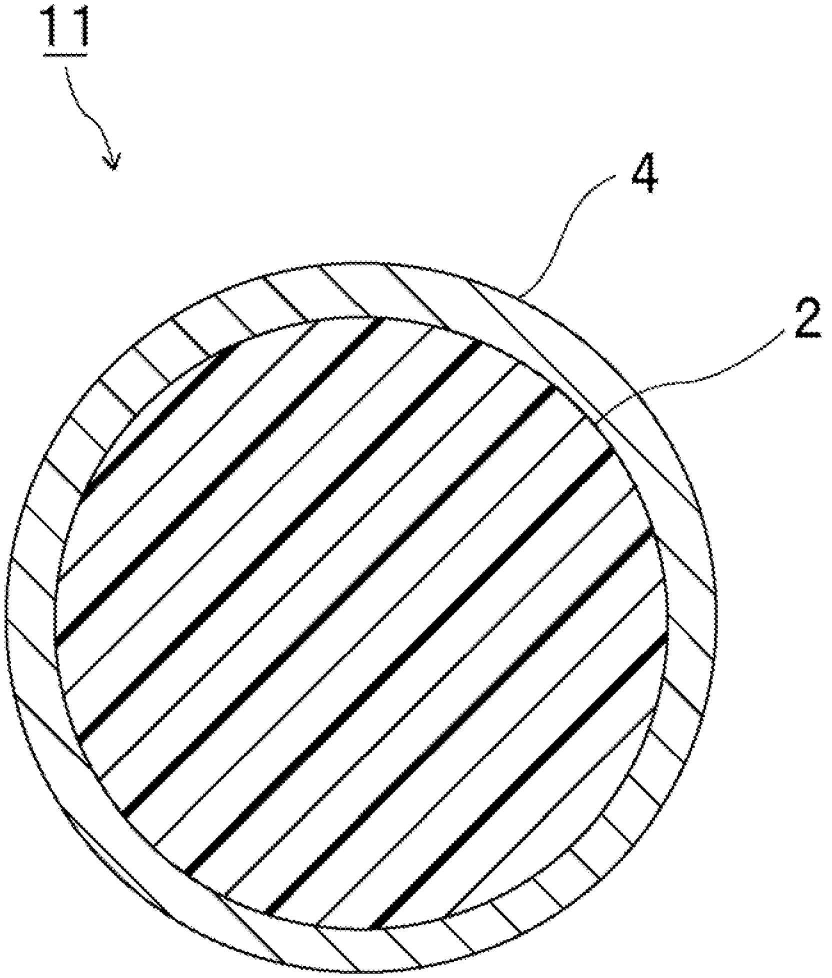

[FIG. 3.]
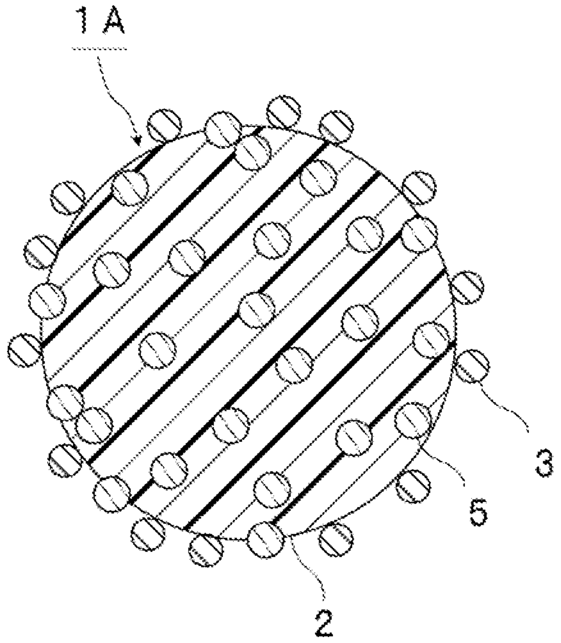
[FIG. 4.]
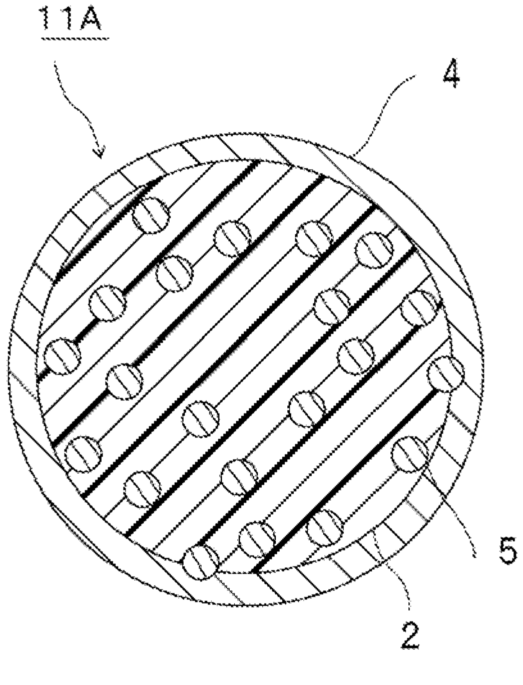

[FIG. 5.]
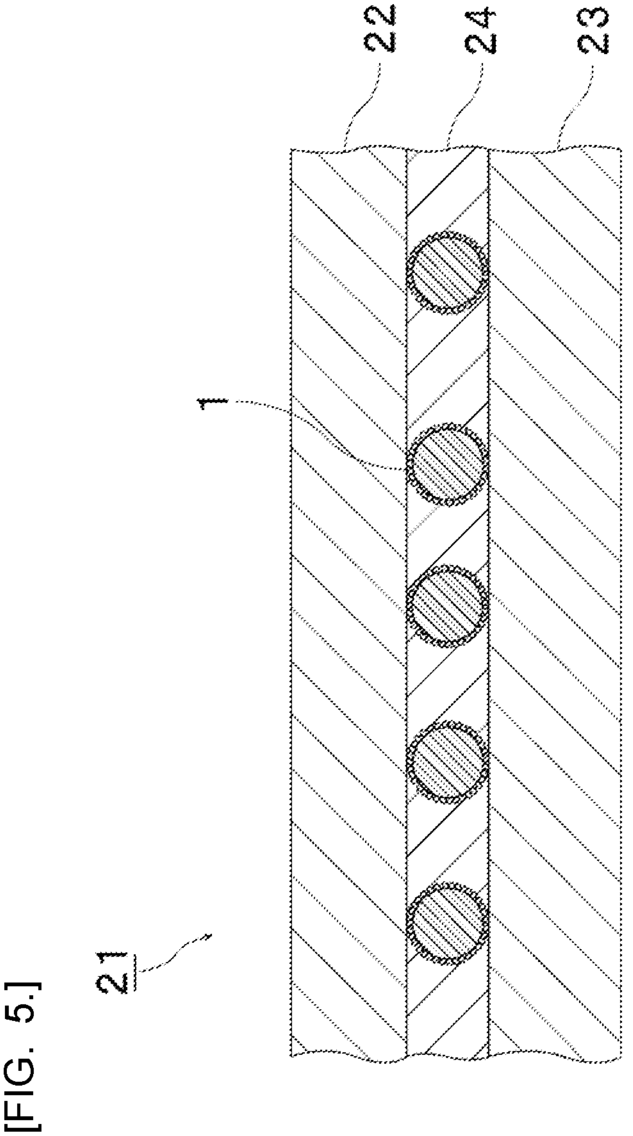

OPTICAL BONDING PARTICLES, ADHESIVE, AND DISPLAY DEVICE

TECHNICAL FIELD

The present invention relates to optical bonding particles prepared using silicone particles. The present invention relates to an adhesive and a display device, which are obtained using the optical bonding particles.

BACKGROUND ART

Various adhesives are used to bond two adherends together. A gap material (spacer) may be blended in the adhesive in order to make the thickness of the adhesive layer formed by the adhesive uniform and to control the spacing (gap) between the two adherends.

Conventional liquid crystal display devices include a liquid crystal panel in which a liquid crystal layer is enclosed between substrates, a pair of polarizing plates sandwiching the liquid crystal panel, an image display unit composed of a backlight unit, and a transparent protective material. In conventional liquid crystal display devices, since there is a gap between the image display unit and the transparent protective material, interfacial reflection may occur by the difference in refractive index between the transparent protective material and air, and the visibility of images may decrease.

To cope with this, a technique (optical bonding) is known which is for decreasing the reflection loss generated at the interface of the transparent protective material and improving the visibility by filling the gap between the image display unit and the transparent protective material with a translucent material (for example, an adhesive) having a refractive index equivalent to that of the transparent protective material.

In recent years, optical bonding has been utilized in various fields. For example, in a display device such as an in-vehicle display, the use of optical bonding is discussed in order to improve the visibility. Specifically, it is discussed to coat an image display element with a material used for optical bonding (optical bonding material, for example, a translucent material such as an adhesive), to dispose a transparent protective material on the surface of the optical bonding material on the opposite side to the image display element side, and to cure the optical bonding material, and the like. The cured product of the optical bonding material forms an adhesive layer that bonds the image display element and the transparent protective material together.

It may be difficult to uniformly coat an image display element with an optical bonding material used in display devices (for example, in-vehicle displays). In addition, since the viscosity of the optical bonding material is low, the optical bonding material flows on the image display element by, for example, the weight of the transparent protective material until the curing of the optical bonding material is completed, and it may not be possible to sufficiently secure the thickness (gap) of the cured product (adhesive layer) of the optical bonding material on the image display element. Hence, it is discussed to use a gap material in an optical bonding material. As the gap material, coated silicone particles and the like may be used.

The following Patent Document 1 discloses silicone fine particles containing 100 parts by mass of silicone elastomer spherical fine particles having a volume average particle diameter of 0.1 μm to 100 μm and 0.5 to 25 parts by mass of polyorganosylsesquioxane covering the surface of the silicone elastomer spherical fine particles. The polyorganosylsesquioxane is granular and has a size of 60 nm or less.

RELATED ART DOCUMENT

Patent Document

Patent Document 1: JP 2013-040241 A

SUMMARY OF THE INVENTION

Problems to be Solved by the Invention

When conventional coated silicone particles as described in Patent Document 1, and the like are used as a gap material of an optical bonding material, since the particle diameter of the coating particles is small (the thickness of the coating layer is thin), it may not be possible to sufficiently decrease the difference in refractive index between the optical bonding material and the gap material. In addition, when the particle diameter of the coating particles is small, it is difficult to uniformly cover the surface of the silicone particles, and the difference in refractive index between the optical bonding material and the gap material may vary. As a result, it may be difficult to sufficiently improve the visibility using conventional coated silicone particles.

When a display device (for example, an in-vehicle display) is repeatedly exposed to temperature changes from low temperatures to high temperatures, stress may be generated between members (for example, an image display element and a transparent protective material) by the difference in linear expansion coefficient between the members. When the thickness (gap) of the cured product (adhesive layer) of the optical bonding material cannot be sufficiently secured, the stress generated between the members cannot be sufficiently relaxed, and cracking and peeling off of the cured product (adhesive layer) of the optical bonding material may occur. In order to relax the stress generated between members, it is required to secure a sufficient thickness (gap) of the cured product (adhesive layer) of the optical bonding material.

An object of the present invention is to provide optical bonding particles capable of improving the visibility and controlling gaps with high accuracy. Another object of the present invention is to provide an adhesive and a display device, which are obtained using the optical bonding particles.

Means for Solving the Problems

According to a broad aspect of the present invention, there are provided optical bonding particles including silicone particles and coating particles or a coating layer disposed on a surface of the silicone particles, in which an absolute value of a difference between a refractive index of the silicone particles and a refractive index of the coating particles or a refractive index of the coating layer is 0.03 or less.

In a certain aspect of the optical bonding particles according to the present invention, a material of the coating particles or a material of the coating layer is silica or silicone resin.

In a certain aspect of the optical bonding particles according to the present invention, a particle diameter of the coating particles or a thickness of the coating layer is nm or more and 500 nm or less.

In a certain aspect of the optical bonding particles according to the present invention, an area of a portion where the coating particles or the coating layer is present is 80% or more in 100% of a total surface area of the silicone particles.

In a certain aspect of the optical bonding particles according to the present invention, a refractive index of the optical bonding particles is 1.40 or more and 1.43 or less.

In a certain aspect of the optical bonding particles according to the present invention, a particle diameter of the optical bonding particles is 30 μm or more and 500 μm or less.

In a certain aspect of the optical bonding particles according to the present invention, the silicone particles include a plurality of inorganic oxide particles, and at least a part of the inorganic oxide particles is present inside the silicone particles.

According to a broad aspect of the present invention, there is provided an adhesive containing the above-described optical bonding particles and a curable component.

In a certain aspect of the adhesive according to the present invention, an absolute value of a difference between a refractive index of a cured product obtained by curing the curable component at 23° C. for 1 hour and a refractive index of the silicone particles is 0.05 or less.

In a certain aspect of the adhesive according to the present invention, an absolute value of a difference between a refractive index of a cured product obtained by curing the curable component at 23° C. for 1 hour and a refractive index of the coating particles or a refractive index of the coating layer is 0.03 or less.

In a certain aspect of the adhesive according to the present invention, a ratio of a transmittance of a cured product obtained by curing the adhesive at 23° C. for 1 hour at a wavelength of 650 nm to a transmittance of a cured product obtained by curing the curable component at 23° C. for 1 hour at a wavelength of 650 nm is 0.94 or more.

According to a broad aspect of the present invention, there is provided a display device including a first member, an image display element as a second member, and an adhesive layer bonding the first member and the second member together, in which the adhesive layer is a cured product of an adhesive containing the above-described optical bonding particles and a curable component.

In a certain aspect of the display device according to the present invention, the first member is a transparent protective material.

Effect of the Invention

The optical bonding particles according to the present invention include silicone particles and coating particles or a coating layer disposed on the surface of the silicone particles. In the optical bonding particles according to the present invention, the absolute value of the difference between the refractive index of the silicone particles and the refractive index of the coating particles or the refractive index of the coating layer is 0.03 or less. The optical bonding particles according to the present invention have the above-mentioned configuration, and are thus capable of improving the visibility and controlling gaps with high accuracy.

BRIEF DESCRIPTION OF DRAWINGS

FIG. 1 is a cross-sectional view illustrating optical bonding particles according to a first embodiment of the present invention.

FIG. 2 is a cross-sectional view illustrating optical bonding particles according to a second embodiment of the present invention.

FIG. 3 is a cross-sectional view illustrating optical bonding particles according to a third embodiment of the present invention.

FIG. 4 is a cross-sectional view illustrating optical bonding particles according to a fourth embodiment of the present invention.

FIG. 5 is a cross-sectional view illustrating an example of a display device fabricated using optical bonding particles according to a first embodiment of the present invention.

MODES FOR CARRYING OUT THE INVENTION

Hereinafter, the details of the present invention will be described.

Optical Bonding Particles

The optical bonding particles according to the present invention include silicone particles and coating particles or a coating layer disposed on the surface of the silicone particles. In the optical bonding particles according to the present invention, the absolute value of the difference between the refractive index of the silicone particles and the refractive index of the coating particles or the refractive index of the coating layer is 0.03 or less.

The optical bonding particles according to the present invention have the above-mentioned configuration, and are thus capable of improving the visibility and controlling gaps with high accuracy.

In recent years, optical bonding has been utilized in various fields. For example, in a display device such as an in-vehicle display, the use of optical bonding is discussed in order to improve the visibility. Specifically, it is discussed to coat an image display element with a material used for optical bonding (optical bonding material, for example, a translucent material such as an adhesive), to dispose a transparent protective material on the surface of the optical bonding material on the opposite side to the image display element side, and to cure the optical bonding material, and the like. The cured product of the optical bonding material forms an adhesive layer that bonds the image display element and the transparent protective material together.

It may be difficult to uniformly coat an image display element with an optical bonding material used in display devices (for example, in-vehicle displays). In addition, since the viscosity of the optical bonding material is low, the optical bonding material flows on the image display element by, for example, the weight of the transparent protective material until the curing of the optical bonding material is completed, and it may not be possible to sufficiently secure the thickness (gap) of the cured product (adhesive layer) of the optical bonding material on the image display element. Hence, it is discussed to use a gap material in an optical bonding material. As the gap material, coated silicone particles and the like may be used.

When conventional coated silicone particles and the like are used as a gap material of an optical bonding material, since the particle diameter of the coating particles in the coated silicone particles is small (the thickness of the coating layer is thin), it may not be possible to sufficiently decrease the difference in refractive index between the optical bonding material and the gap material. In addition, when the particle diameter of the coating particles in the coated silicone particles is small, it is difficult to uniformly cover the surface of the silicone particles, and the difference in refractive index between the optical bonding material and the gap material may vary. As a result, it may be difficult to sufficiently improve the visibility using conventional coated silicone particles. The optical bonding particles according to the present invention have the above-mentioned configuration, and thus the visibility can be improved when the optical bonding material contains a gap material (optical bonding particles) as well.

When a display device (for example, an in-vehicle display) is repeatedly exposed to temperature changes from low temperatures to high temperatures, stress may be generated between members (for example, an image display element and a transparent protective material) by the difference in linear expansion coefficient between the members. When the thickness (gap) of the cured product (adhesive layer) of the optical bonding material cannot be sufficiently secured, the stress generated between the members cannot be sufficiently relaxed, and cracking and peeling off of the cured product (adhesive layer) of the optical bonding material may occur. In order to relax the stress generated between members, it is required to secure a sufficient thickness (gap) of the cured product (adhesive layer) of the optical bonding material. By using the optical bonding particles according to the present invention, the thickness (gap) of the adhesive layer can be controlled with high accuracy, and the thickness (gap) of the adhesive layer can be sufficiently secured.

FIG. 1 is a cross-sectional view illustrating optical bonding particles according to a first embodiment of the present invention.

Optical bonding particles 1 illustrated in FIG. 1 include silicone particles 2 and coating particles 3 disposed on the surface of the silicone particles 2. The coating particles 3 are in contact with the surface of the silicone particles 2 and cover the surface of the silicone particles 2. The optical bonding particles 1 are coated particles in which the surface of the silicone particles 2 is covered with the coating particles 3. The coating particles may completely cover the surface of the silicone particles, or may not completely cover the surface of the silicone particles. The silicone particles may have a portion not covered with the coating particles. The coating particles may be in contact with other coating particles or may overlap other coating particles. In the optical bonding particles, a plurality of the coating particles may overlap each other to form a stacked structure.

FIG. 2 is a cross-sectional view illustrating optical bonding particles according to a second embodiment of the present invention.

Optical bonding particles 11 illustrated in FIG. 2 include silicone particles 2 and a coating layer 4 disposed on the surface of the silicone particles 2. The coating layer 4 is in contact with the surface of the silicone particles 2 and covers the surface of the silicone particles 2. The optical bonding particles 11 are coated particles in which the surface of the silicone particles 2 is covered with the coating layer 4. The coating layer may completely cover the surface of the silicone particles, or may not completely cover the surface of the silicone particles. The silicone particles may have a portion not covered with the coating layer. The coating layer may have a single layer structure or a stacked structure of two or more layers. When the coating layer has a stacked structure of two or more layers, the materials of the respective layers may be the same as or different from each other.

FIG. 3 is a cross-sectional view illustrating optical bonding particles according to a third embodiment of the present invention.

Optical bonding particles 1A illustrated in FIG. 3 include silicone particles 2 and coating particles 3 disposed on the surface of the silicone particles 2. The silicone particles 2 include a plurality of inorganic oxide particles 5. The coating particles 3 are in contact with the surface of the silicone particles 2 and cover the surface of the silicone particles 2. The optical bonding particles 1A are coated particles in which the surface of the silicone particles 2 is covered with the coating particles 3. The coating particles may completely cover the surface of the silicone particles, or may not completely cover the surface of the silicone particles. The silicone particles may have a portion not covered with the coating particles. The coating particles may be in contact with other coating particles or may overlap other coating particles. In the optical bonding particles, a plurality of the coating particles may overlap each other to form a stacked structure. In the optical bonding particles 1A, at least a part of the inorganic oxide particles 5 is present inside the silicone particles 2. In the optical bonding particles 1A, a part of the inorganic oxide particles 5 is present outside the silicone particles 2. In the optical bonding particles, all of the inorganic oxide particles may be present inside the silicone particles. The inorganic oxide particles may be in contact with other inorganic oxide particles or may overlap other inorganic oxide particles.

FIG. 4 is a cross-sectional view illustrating optical bonding particles according to a fourth embodiment of the present invention.

Optical bonding particles 11A illustrated in FIG. 4 include silicone particles 2 and a coating layer 4 disposed on the surface of the silicone particles 2. The silicone particles 2 include a plurality of inorganic oxide particles 5. The coating layer 4 is in contact with the surface of the silicone particles 2 and covers the surface of the silicone particles 2. The optical bonding particles 11A are coated particles in which the surface of the silicone particles 2 is covered with the coating layer 4. The coating layer may completely cover the surface of the silicone particles, or may not completely cover the surface of the silicone particles. The silicone particles may have a portion not covered with the coating layer. The coating layer may have a single layer structure or a stacked structure of two or more layers. When the coating layer has a stacked structure of two or more layers, the materials of the respective layers may be the same as or different from each other. In the optical bonding particles 11A, at least a part of the inorganic oxide particles 5 is present inside the silicone particles 2. In the optical bonding particles 11A, a part of the inorganic oxide particles 5 is present outside the silicone particles 2. In the optical bonding particles, all of the inorganic oxide particles may be present inside the silicone particles. The inorganic oxide particles may be in contact with other inorganic oxide particles or may overlap other inorganic oxide particles.

From the viewpoint of further improving the visibility, the refractive index of the optical bonding particles is preferably 1.40 or more, more preferably 1.41 or more and preferably 1.43 or less, more preferably 1.42 or less.

The refractive index can be measured by the minimum angle of deviation method, the critical angle method, the V-block bend method, and the like. It is preferable to measure the refractive index of a minute sample such as optical bonding particles by a method conforming to JIS K7142: 2014 Plastics-Determination of refractive index Method B. When the optical bonding particles are contained in an adhesive together with a curable component, the curable component can be dissolved in a solvent such as toluene, the optical bonding particles can be recovered, washed and dried, and the refractive index can be measured. The refractive index of the silicone particles, the refractive index of the coating particles, and the refractive index of the coating layer can be measured by the following method. The optical bonding particles are immersed in acetone to swell the silicone particles, and the coating particles or coating layer disposed on the surface of the silicone particles is peeled off. The peeled off coating particles or coating layer is recovered, washed and dried, and the refractive index of the coating particles or coating layer is measured. The silicone particles from which the coating particles or coating layer disposed on the surface has been removed are washed and dried, and the refractive index of the silicone particles is measured.

The particle diameter of the optical bonding particles is preferably 30 μm or more, more preferably 100 μm or more and preferably 500 μm or less, more preferably 200 μm or less. When the particle diameter of the optical bonding particles is equal to or more than the lower limit and less than or equal to the upper limit, the optical bonding particles can be more suitably used in optical bonding applications, and the optical bonding particles can be more suitably used to obtain an optical bonding adhesive.

The particle diameter of the optical bonding particles means a diameter when the optical bonding particles are a true sphere. When the optical bonding particles have a shape other than a true sphere, the particle diameter of the optical bonding particles means a diameter when the optical bonding particles are assumed to be a true sphere corresponding to the volume. The particle diameter of the optical bonding particles is preferably an average particle diameter, more preferably a number average particle diameter. The particle diameter of the optical bonding particles can be measured using an arbitrary particle size distribution measuring apparatus. For example, the particle diameter can be measured using a particle size distribution measuring apparatus employing principles such as laser light scattering, electric resistance change, and image analysis after imaging. Specific examples of the method for measuring the particle diameter of the optical bonding particles include a method in which the particle diameters of about 100,000 optical bonding particles are measured using a particle size distribution measuring apparatus ("Multisizer 4" manufactured by Beckman Coulter, Inc.) and the average particle diameter is calculated.

The coefficient of variation (CV value) of the particle diameter of the optical bonding particles is preferably 10% or less, more preferably 7% or less, still more preferably 5% or less. When the CV value is equal to or less than the upper limit, the gap can be controlled with higher accuracy, and the optical bonding particles can be more suitably used in optical bonding applications.

The CV value is expressed by the following equation.

$$CV \text{ value } (\%) = (\rho / Dn) \times 100$$

ρ: Standard deviation of particle diameters of optical bonding particles

Dn: Average value of particle diameters of optical bonding particles

The optical bonding particles are preferably used to obtain an adhesive. The optical bonding particles are preferably used in an adhesive to bond two members together. The optical bonding particles are preferably used as spacers. The optical bonding particles are preferably used as spacers in the adhesive. Examples of the use of the optical bonding particles include a spacer for gap control and a spacer for stress relaxation. The spacer for gap control can be used for gap control of a stacked chip for securing a stand-off height and flatness, gap control of an optical component for securing the smoothness of a glass surface and the thickness of an adhesive layer. The spacer for stress relaxation can be used for stress relaxation of a sensor chip and the like, stress relaxation of an adhesive structure such as a pressure sensor, stress relaxation of an adhesive layer bonding two adherends together, and the like. The optical bonding particles can be used in pressure sensors, die bonding materials, conductive adhesives, optical bonding materials and the like. The optical bonding particles are preferably used to obtain an optical bonding adhesive.

Hereinafter, other details of the optical bonding particles will be described. In the present specification, "(meth) acrylate" means one or both of "acrylate" and "methacrylate", and "(meth)acryl" means one or both of "acryl" and "methacryl".

(Silicone Particles)

The material of the silicone particles is preferably silicone resin. The silicone particles preferably contain silicone resin. The silicone particles are preferably silicone spacers.

From the viewpoint of further improving the visibility, the silicone particles preferably include a plurality of inorganic oxide particles. In the silicone particles, at least a part of the inorganic oxide particles is present inside the silicone particles. In the silicone particles, a part of the inorganic oxide particles may be present outside the silicone particles or all of the inorganic oxide particles may be present inside the silicone particles. The volume of the portion of arbitrary one inorganic oxide particle present inside the silicone particle is preferably 10% or more, more preferably 30% or more, still more preferably 50% or more in 100% of the volume of the inorganic oxide particle. The volume of the portion of arbitrary one inorganic oxide particle present inside the silicone particle is preferably 100% or less and may be less than 100% in 100% of the volume of the inorganic oxide particle. From the viewpoint of improving the dispersibility of the silicone particles, the silicone particles are preferably silicone particles in which an inorganic oxide particle of which a part is present inside the silicone particle and an inorganic oxide particle of which the entirety is present inside the silicone particle are mixed.

Examples of the material of the inorganic oxide particles include silica, silicone resin, fluororesin, alumina, barium titanate, zirconia, silicate glass, borosilicate glass, lead glass, soda-lime glass and alumina silicate glass.

The material of the inorganic oxide particles preferably contains silica, silicone resin, or fluororesin, more preferably contains silica or silicone resin, still more preferably contains silica, and is particularly preferably silica. When the material of the inorganic oxide particles satisfies the preferable aspects, the visibility can be further improved and the gap can be controlled with higher accuracy.

It is preferable that the silicone particles do not contain a platinum catalyst or contain a platinum catalyst at 100 ppm or less. When a platinum catalyst is used, it is more preferable as the content of the platinum catalyst is smaller. When the content of the platinum catalyst is higher, the reliability tends to decrease. The content of the platinum catalyst is more preferably 80 ppm or less, further preferably 60 ppm or less, still more preferably 50 ppm or less, yet still more preferably 40 ppm or less, particularly preferably 30 ppm or less, particularly preferably 20 ppm or less, most preferably 10 ppm or less.

In general, silicone particles are often obtained by polymerizing a monomer using a platinum catalyst. Such silicone particles contain a platinum catalyst inside even if washed, and the content of the platinum catalyst exceeds 100 ppm. On the other hand, the silicone particles obtained without using a platinum catalyst generally do not contain a platinum catalyst.

The material of the silicone particles is preferably organopolysiloxane, more preferably a silane alkoxide. One kind of organopolysiloxane or one kind of silane alkoxide may be used singly, or two or more kinds of organopolysiloxanes or two or more kinds of silane alkoxides may be used concurrently.

From the viewpoint of further improving the visibility and the viewpoint of controlling the gap with higher accuracy, the silane alkoxide preferably contains a silane alkoxide A represented by the following Formula (1A) or a silane alkoxide B represented by the following Formula (1B). The silane alkoxide may contain a silane alkoxide A represented by the following Formula (1A), or may contain a silane alkoxide B represented by the following Formula (1B).

$$Si(R1)_n(OR2)_{4-n} \tag{1A}$$

In Formula (1A), R1 represents a hydrogen atom, a phenyl group or an alkyl group having 1 to 30 carbon atoms, R2 represents an alkyl group having 1 to 6 carbon atoms, and n represents an integer of 0 to 2. When n is 2, a plurality of R1s may be the same as or different from each other. A plurality of R2s may be the same as or different from each other.

When R1 in Formula (1A) is an alkyl group having 1 to carbon atoms, specific examples of R1 include a methyl group, an ethyl group, a propyl group, an isopropyl group, an isobutyl group, a n-hexyl group, a cyclohexyl group, a n-octyl group, and a n-decyl group. This alkyl group has preferably 10 or less, more preferably 6 or less carbon atoms. Alkyl groups include cycloalkyl groups.

Specific examples of R2 include a methyl group, an ethyl group, an n-propyl group, an isopropyl group, an n-butyl group, and an isobutyl group.

Specific examples of the silane alkoxide A include tetramethoxysilane, tetraethoxysilane, methyltrimethoxysilane, methyltriethoxysilane, ethyltrimethoxysilane, ethyltriethoxysilane, isopropyltrimethoxysilane, isobutyltrimethoxysilane, cyclohexyltrimethoxysilane, n-hexyltrimethoxysilane, n-octyltriethoxysilane, n-decyltrimethoxysilane, phenyltrimethoxysilane, dimethyldimethoxysilane, dimethyldiethoxysilane, diisopropyldimethoxysilane, and diphenyldimethoxysilane. Silane alkoxides other than these may be used.

$$Si(R1)_n(OR2)_{4-n} \tag{1B}$$

In Formula (1B), R1 represents a hydrogen atom, a phenyl group, an alkyl group having 1 to 30 carbon atoms, or an organic group having a polymerizable double bond and 1 to carbon atoms, R2 represents an alkyl group having 1 to 6 carbon atoms, and n represents an integer of 0 to 2. When n is 2, a plurality of R1s may be the same as or different from each other. A plurality of R2s may be the same as or different from each other. However, at least one R1 is an organic group having a polymerizable double bond and 1 to 30 carbon atoms. At least one R1 is preferably a vinyl group, a styryl group or a (meth)acryloxy group, more preferably a vinyl group or a (meth)acryloxy group, still more preferably a (meth)acryloxy group.

When R1 in Formula (1B) is an alkyl group having 1 to carbon atoms, specific examples of R1 include a methyl group, an ethyl group, a propyl group, an isopropyl group, an isobutyl group, a n-hexyl group, a cyclohexyl group, a n-octyl group, and a n-decyl group. This alkyl group has preferably 10 or less, more preferably 6 or less carbon atoms. Alkyl groups include cycloalkyl groups.

Examples of the polymerizable double bond include a carbon-carbon double bond. When R1 is an organic group having a polymerizable double bond and 1 to 30 carbon atoms, specific examples of R1 include a vinyl group, a styryl group, an allyl group, an isopropenyl group, and a 3-(meth)acryloxyalkyl group. Examples of the styryl group include a p-styryl group, an o-styryl group, and an m-styryl group. Examples of the (meth)acryloxyalkyl group include a (meth)acryloxymethyl group, a (meth)acryloxyethyl group, and a (meth)acryloxypropyl group. The organic group having a polymerizable double bond and 1 to 30 carbon atoms has preferably 2 or more carbon atoms and preferably 30 or less, more preferably 10 or less carbon atoms. The term "(meth)acryloxy" refers to acryloxy and methacryloxy.

Specific examples of R2 include a methyl group, an ethyl group, an n-propyl group, an isopropyl group, an n-butyl group, and an isobutyl group.

From the viewpoint of further improving the visibility and the viewpoint of controlling the gap with higher accuracy, the silane alkoxide preferably contains dialkoxysilane.

In the hydrolyzed condensate of the silane alkoxide, it is preferable that monoalkoxysilane is 0% by weight (unused) or more and 20% by weight or less, dialkoxysilane is 70% by weight or more and 99.9% by weight or less, and the sum of trialkoxysilane and tetraalkoxysilane is 0.1% by weight or more and 30% by weight or less in 100% by weight of the silane alkoxide. In the hydrolyzed condensate of the silane alkoxide, it is preferable that monoalkoxysilane is 0% by weight (unused) or more and 15% by weight or less, dialkoxysilane is 75% by weight or more and 99% by weight or less, and the sum of trialkoxysilane and tetraalkoxysilane is 1% by weight or more and 25% by weight or less in 100% by weight of the silane alkoxide. As the hydrolyzed condensate of the silane alkoxide satisfies the preferable aspects, it is possible to obtain a gap material capable of further improving the visibility and controlling the gap with higher accuracy.

From the viewpoint of adjusting the particle diameter more easily, it is preferable that the silane alkoxide contains a silane alkoxide having a polymerizable functional group, and it is more preferable that the silane alkoxide contains a silane alkoxide having a polymerizable double bond. Examples of the silane alkoxide having a polymerizable double bond include vinyltrimethoxysilane, vinyltriethoxysilane, dimethoxymethylvinylsilane, dimethoxyethylvinylsilane, diethoxymethylvinylsilane, diethoxyethylvinylsilane, ethylmethyldivinylsilane, methylvinyldimethoxysilane, ethylvinyldimethoxysilane, methylvinyldiethoxysilane, ethylvinyldiethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane. Cyclic siloxane may be used, or modified (reactive) silicone oil and the like may be used. Examples of the cyclic siloxane include decamethylcyclopentasiloxane. Examples of the modified silicone oil include one-terminal modified silicone oil, both-terminal silicone oil, and side-chain type silicone oil.

Examples of a specific method for fabricating the silicone particles include a method in which the silane alkoxide is condensed in advance to obtain an oligomer and then a polymerization reaction is conducted by a suspension polymerization method, a dispersion polymerization method, a mini emulsion polymerization method, an emulsion polymerization method, or the like to fabricate silicone particles.

From the viewpoint of further improving the visibility, the refractive index of the silicone particles is preferably 1.39 or more, more preferably 1.40 or more and preferably 1.44 or less, more preferably 1.43 or less.

The refractive index of the silicone particles can be measured by a method conforming to JIS K7142: 2014 Plastics-Determination of refractive index Method B.

The particle diameter of the silicone particles is preferably 30 μm or more, more preferably 50 μm or more, still more preferably more than 100 μm. The particle diameter of the silicone particles is preferably 500 μm or less, more preferably 200 μm or less. When the particle diameter of the silicone particles is equal to or more than the lower limit and less than or equal to the upper limit, the silicone particles can be more suitably used in optical bonding applications, and the silicone particles can be more suitably used to obtain optical bonding particles.

The particle diameter of the silicone particles means a diameter when the silicone particles are a true sphere. When the silicone particles have a shape other than a true sphere, the particle diameter of the silicone particles means a diameter when the silicone particles are assumed to be a true sphere corresponding to the volume. The particle diameter of the silicone particles is preferably an average particle diameter, more preferably a number average particle diameter. The particle diameter of the silicone particles can be measured using an arbitrary particle size distribution measuring apparatus. For example, the particle diameter can be measured using a particle size distribution measuring apparatus employing principles such as laser light scattering, electric resistance change, and image analysis after imaging. Specific examples of the method for measuring the particle diameter of the silicone particles include a method in which the particle diameters of about 100,000 silicone particles are measured using a particle size distribution measuring apparatus ("Multisizer 4" manufactured by Beckman Coulter, Inc.) and the average particle diameter is calculated.

The coefficient of variation (CV value) of the particle diameter of the silicone particles is preferably 10% or less, more preferably 7% or less, still more preferably 5% or less. When the CV value is equal to or less than the upper limit, the gap can be controlled with higher accuracy, and the silicone particles can be more suitably used to obtain optical bonding particles.

The CV value is expressed by the following equation.

$$CV \text{ value } (\%) = (\rho / Dn) \times 100$$

ρ: Standard deviation of particle diameters of silicone particles

Dn: Average value of particle diameters of silicone particles (Coating Particles or Coating Layer)

The material of the coating particles or coating layer is not particularly limited. The material of the coating particles or coating layer may be an organic material or an inorganic material.

Examples of the organic material include polyolefin resins such as polyethylene, polypropylene, polystyrene, polyvinyl chloride, polyvinylidene chloride, polyisobutylene, and polybutadiene; acrylic resins such as polymethyl methacrylate and polymethyl acrylate; polycarbonate, polyamide, phenol formaldehyde resin, melamine formaldehyde resin, benzoguanamine formaldehyde resin, urea formaldehyde resin, phenol resin, melamine resin, benzoguanamine resin, urea resin, epoxy resin, unsaturated polyester resin, saturated polyester resin, polyethylene terephthalate, polysulfone, polyphenylene oxide, polyacetal, polyimide, polyamideimide, polyether ether ketone, polyether sulfone, divinylbenzene polymer, and divinylbenzene-based copolymer. Examples of the divinylbenzene copolymer include divinylbenzene-styrene copolymer and divinylbenzene-(meth)acrylate copolymer. Since the coating particles or coating layer can be easily fabricated, the material of the coating particles or coating layer is preferably a polymer obtained by polymerizing one or two or more polymerizable monomers having an ethylenically unsaturated group.

When the coating particles or coating layer are obtained by polymerizing a polymerizable monomer having an ethylenically unsaturated group, examples of the polymerizable monomer having an ethylenically unsaturated group include non-crosslinkable monomers and crosslinkable monomers.

Examples of the non-crosslinkable monomers include, as a vinyl compound, styrene monomers such as styrene, α-methyl styrene, and chlorostyrene; vinyl ether compounds such as methyl vinyl ether, ethyl vinyl ether, and propyl vinyl ether; acid vinyl ester compounds such as vinyl acetate, vinyl butylate, vinyl laurate, and vinyl stearate; and halogen-containing monomers such as vinyl chloride and vinyl fluoride; as a (meth)acrylic compound, alkyl (meth) acrylate compounds such as methyl (meth)acrylate, ethyl (meth)acrylate, propyl (meth)acrylate, butyl (meth)acrylate, 2-ethylhexyl (meth)acrylate, lauryl (meth)acrylate, cetyl (meth)acrylate, stearyl (meth)acrylate, cyclohexyl (meth) acrylate, and isobornyl (meth)acrylate; oxygen atom-containing (meth)acrylate compounds such as 2-hydroxyethyl (meth)acrylate, glycerol (meth)acrylate, polyoxyethylene (meth)acrylate, and glycidyl (meth)acrylate; nitrile-containing monomers such as (meth)acrylonitrile; and halogen-containing (meth)acrylate compounds such as trifluoromethyl (meth)acrylate, pentafluoroethyl (meth)acrylate, (perfluorobutyl)ethyl (meth)acrylate, perfluorobutyl-hydroxypropyl (meth)acrylate, (perfluorohexyl)ethyl (meth) acrylate, octafluoropentyl (meth)acrylate, perfluorooctylethyl (meth)acrylate, and tetrafluoropropyl (meth)acrylate; as an α-olefin compound, olefin compounds such as diisobutylene, isobutylene, LINEALENE, ethylene, and propylene; and as a conjugated diene compound, isoprene and butadiene.

Examples of the crosslinkable monomer include, as a vinyl compound, a vinyl-based monomer such as divinylbenzene, 1,4-divinyloxybutane, and divinyl sulfone; as a (meth)acrylic compound, a polyfunctional (meth)acrylate compound such as tetramethylolmethane tetra(meth)acrylate, polytetramethylene glycol diacrylate, tetramethylolmethane tri(meth)acrylate, tetramethylolmethane di(meth) acrylate, trimethylolpropane tri(meth)acrylate, dipentaerythritol hexa(meth)acrylate, dipentaerythritol penta(meth)acrylate, glycerol tri(meth)acrylate, glycerol di(meth)acrylate, polyethylene glycol di(meth)acrylate, polypropylene glycol di(meth)acrylate, polytetramethylene glycol di(meth)acrylate, 1,3-butylene glycol di(meth)acrylate, 1,4-butanediol di(meth)acrylate, 1,6-hexanediol di(meth)acrylate, and 1,9-nonanediol di(meth)acrylate; as an allyl compound, triallyl (iso)cyanurate, triallyl trimellitate, diallyl phthalate, diallyl acrylamide, and diallyl ether; as a silane compound, a silane alkoxide compound such as tetramethoxysilane, tetraethoxysilane, methyltrimethoxysilane, methyltriethoxysilane, ethyltrimethoxysilane, ethyltriethoxysilane, isopropyltrimethoxysilane, isobutyltrimethoxysilane, cyclohexyl trimethoxysilane, n-hexyltrimethoxysilane, n-octyltriethoxysilane, n-decyltrimethoxysilane, phenyltrimethoxysilane, dimethyldimethoxysilane, dimethyidiethoxysilane, diisopropyldimethoxysilane, trimethoxysilyl styrene, γ-(meth)acryloxypropyltrimethoxysilane, 1,3-divinyltetramethyldisiloxane, methylphenyldimethoxysilane, and diphenyidimethoxysilane; a polymerizable double bond-containing silane alkoxide such as vinyltrimethoxysilane, vinyltriethoxysilane, dimethoxymethylvinylsilane, dimethoxyethylvinylsilane, diethoxymethylvinylsilane, diethoxyethylvinylsilane, ethylmethyldivinylsilane, methylvinyldimethoxysilane, ethylvinyldimethoxysilane, methylvinyldiethoxysilane, ethylvinyldiethoxysilane, p-styryltrimethoxysilane,
3-methacryloxypropylmethyldimethoxysilane, 3-methacryloxypropyl trimethoxysilane, 3-methacryloxypropylmethyldiethoxysilane, 3-methacryloxypropyl triethoxy silane, and 3-acryloxypropyltrimethoxysilane; a cyclic siloxane such as decamethylcyclopentasiloxane; a modified (reactive) silicone oil such as one-terminal modified silicone oil, both-terminal silicone oil, and side-chain type silicone oil; and a carboxyl group-containing monomer such as (meth)acrylic acid, maleic acid, and maleic anhydride.

The coating particles or coating layer can be obtained by polymerizing the polymerizable monomer having an ethylenically unsaturated group. The polymerization method is not particularly limited, and examples thereof include known methods such as radical polymerization, ionic polymerization, polycondensation (condensation polymerization), addition condensation, living polymerization, and living radical polymerization. Other polymerization methods include suspension polymerization in the presence of a radical polymerization initiator.

Examples of the inorganic material include silica, alumina, barium titanate, zirconia, carbon black, silicate glass, borosilicate glass, lead glass, soda lime glass, and alumina silicate glass.

The material of the coating particles or coating layer preferably contains silica, silicone resin, or fluororesin, and more preferably contains silica or silicone resin. When the material of the coating particles or coating layer satisfies the preferable aspects, the visibility can be further improved and the gap can be controlled with higher accuracy.

From the viewpoint of further improving the visibility, the refractive index of the coating particles and the refractive index of the coating layer are preferably 1.39 or more, more preferably 1.395 or more and preferably 1.42 or less, more preferably 1.415 or less.

The refractive index of the coating particles and the refractive index of the coating layer can be measured by a method conforming to JIS K7142: 2014 Plastics-Determination of refractive index Method B. When the size of the coating particles or the thickness of the coating layer is smaller than the wavelength of light and a clear image cannot be observed using an optical microscope, a phenomenon is utilized in which a turbid region is not observed using an optical microscope in the immersion liquid having a refractive index the same as that of the sample and a turbid region is observed using an optical microscope in an immersion liquid having a refractive index different from that of the sample. In other words, the refractive index of the immersion liquid in which a turbid region is not observed is taken as the refractive index of the coating particles or the refractive index of the coating layer.

The absolute value of the difference between the refractive index of the silicone particles and the refractive index of the coating particles or the refractive index of the coating layer is preferably 0.025 or less, more preferably 0.020 or less. The lower limit of the absolute value of the difference between the refractive index of the silicone particles and the refractive index of the coating particles or the refractive index of the coating layer is not particularly limited. The absolute value of the difference between the refractive index of the silicone particles and the refractive index of the coating particles or the refractive index of the coating layer may be 0 or more. When the absolute value of the difference between the refractive index of the silicone particles and the refractive index of the coating particles or the refractive index of the coating layer is equal to or more than the lower limit and less than or equal to the upper limit, the visibility can be further improved.

Examples of the method for controlling the absolute value of the difference between the refractive index of the silicone particles and the refractive index of the coating particles or the refractive index of the coating layer in the preferable range include a method in which a silane compound having a radically polymerizable functional group containing fluorine in the side chain is used as the material of the coating particles or the material of the coating layer.

The area (coverage) of the portion where the coating particles or the coating layer is present is preferably 80% or more, more preferably 85% or more in 100% of the total surface area of the silicone particles. The upper limit of the coverage is not particularly limited. The coverage may be 99% or less. When the coverage is equal to or more than the lower limit, the visibility can be further improved and the gap can be controlled with higher accuracy.

The area (coverage) of the portion where the coating particles or the coating layer is present in 100% of the total surface area of the silicone particles is determined by observing the silicone particles under an electron microscope or an optical microscope and calculating the percentage of the surface area of the portion where the coating particles or the coating layer is present with respect to the projected area of the silicone particles.

In the optical bonding particles, the particle diameter of the coating particles or the thickness of the coating layer is preferably 30 nm or more, more preferably more than 60 nm, still more preferably 80 nm or more, particularly preferably 100 nm or more. In the optical bonding particles, the particle diameter of the coating particles or the thickness of the coating layer is preferably 500 nm or less, more preferably 200 nm or less. When the particle diameter of the coating particles or the thickness of the coating layer satisfies the lower limit and the upper limit, the visibility can be further improved and the gap can be controlled with higher accuracy.

When the optical bonding particles include the coating particles, the particle diameter of the coating particles means a diameter when the coating particles are a true sphere. When the coating particles have a shape other than a true sphere, the particle diameter of the coating particles means a diameter when the coating particles are assumed to be a true sphere corresponding to the volume. The particle diameter of the coating particles is preferably an average particle diameter, more preferably a number average particle diameter. The particle diameter of the coating particles is determined by observing arbitrary 50 coating particles under an electron microscope or an optical microscope and calculating the average value and performing laser diffraction type particle size distribution measurement. In the observation under an electron microscope or an optical microscope, the particle diameter of the coating particles per one particle is determined as a particle diameter corresponding to an equivalent circle diameter. In the observation under an electron microscope or an optical microscope, the average particle diameter obtained from the equivalent circle diameters of arbitrary 50 coating particles is substantially equal to the average particle diameter corresponding to an equivalent sphere diameter. In the laser diffraction type particle size distribution measurement, the particle diameter of the coating particles per one particle is determined as a particle diameter corresponding to an equivalent sphere diameter. The particle diameter of the coating particles is preferably calculated by laser diffraction particle size distribution measurement.

When the optical bonding particles include the coating layer, the thickness of the coating layer can be measured by observing the cross section of the optical bonding particles, for example, under a transmission electron microscope (TEM). With regard to the thickness of the coating layer, it is preferable to calculate the average value of the thicknesses at arbitrary five positions of the coating layer as the thickness of the coating layer of one optical bonding particle, and it is more preferable to calculate the average value of the thickness of the entire coating layer as the thickness of the coating layer of one optical bonding particle. In the case of a plurality of optical bonding particles, the thickness of the coating layer is preferably determined by calculating the average value of the thicknesses of the coating layers for ten arbitrary optical bonding particles.

In the optical bonding particles, the ratio (particle diameter of coating particles or thickness of coating layer/particle diameter of silicone particles) of the particle diameter of the coating particles or the thickness of the coating layer to the particle diameter of the silicone particles is preferably 0.0003 or more, more preferably 0.001 or more and preferably 0.02 or less, more preferably 0.01 or less. When the ratio (particle diameter of coating particles or thickness of coating layer/particle diameter of silicone particles) is equal to or more than the lower limit and less than or equal to the upper limit, the visibility can be further improved and the gap can be controlled with higher accuracy.

The method for disposing the coating particles or the coating layer on the surface of the silicone particles is not particularly limited. Examples of the method for disposing the coating particles or the coating layer include a method in which a graft chain is introduced by chemical bonding, a mechanochemical method in which mechanical energy is applied to immobilize the coating particles or the coating layer on the surface, and a heteroaggregation method utilizing a potential difference on the surface. From the viewpoint of more easily disposing the coating particles or the coating layer on the surface of the silicone particles, the method for disposing the coating particles or the coating layer is preferably a heteroaggregation method utilizing a potential difference on the surface.

(Adhesive)

The adhesive according to the present invention contains the above-described optical bonding particles and a curable component. The optical bonding particles are preferably dispersed in the curable component. The curable component preferably has fluidity. The adhesive or the curable component is preferably in the form of a paste. The paste form includes a liquid form.

The adhesive may be a one-component type in which a main agent, a curing agent and the like are mixed together in advance, or a two-component type in which the main agent and the curing agent are separated. The adhesive may be a condensation curing type or an addition curing type. The adhesive may be cured using a catalyst such as platinum, or may be cured by moisture or the like. From the viewpoint of more effectively decreasing the residual stress in the cured product of the adhesive, the adhesive is preferably cured at room temperature.

The adhesive can bond two adherends together, for example. The adhesive is preferably used to form an adhesive layer that bonds two adherends together. The adhesive is preferably used to relax the stress of the adhesive layer and is preferably cured at 25° C.

The adhesive may contain conductive particles or may not contain conductive particles. The adhesive may be used for conductive connection or may not be used for conductive connection. The adhesive may be used for the anisotropic conductive connection or may not be used for anisotropic conductive connection. The adhesive may not be a conductive material and may not be an anisotropic conductive material. The adhesive may be used in a liquid crystal display element or may not be used in a liquid crystal display element. The adhesive is preferably used in optical bonding applications. The adhesive is preferably used in a display device to fill the gap between the image display element and the transparent protective material, decrease the reflection loss occurring at the interface of the transparent protective material, and improve the visibility.

From the viewpoint of further improving the visibility, the refractive index of the cured product obtained by curing the curable component at 23° C. for 1 hour is preferably 1.40 or more, more preferably 1.41 or more and preferably 1.43 or less, more preferably 1.42 or less.

The refractive index of the cured product can be measured as follows.

The curable component is cured at 23° C. for 1 hour to fabricate a film having a thickness of about 1 μm. The refractive index of the obtained film is measured using an Abbe refractometer ("ER-7MW" manufactured by ERMA) or the like.

From the viewpoint of further improving the visibility, the absolute value of the difference between the refractive index of the cured product obtained by curing the curable component at 23° C. for 1 hour and the refractive index of the silicone particles is preferably 0.05 or less, more preferably 0.03 or less. The absolute value of the difference between the refractive index of the cured product and the refractive index of the silicone particles may be 0 or more.

From the viewpoint of further improving the visibility, the absolute value of the difference between the refractive index of the cured product obtained by curing the curable component at 23° C. for 1 hour and the refractive index of the coating particles or the refractive index of the coating layer is preferably 0.03 or less, more preferably 0.02 or less. The absolute value of the difference between the refractive index of the cured product and the refractive index of the coating particles or the refractive index of the coating layer may be 0 or more.

The ratio of the transmittance of the cured product obtained by curing the adhesive at 23° C. for 1 hour at a wavelength of 650 nm to the transmittance of the cured product obtained by curing the curable component at 23° C. for 1 hour at a wavelength of 650 nm is preferably 0.92 or more, more preferably 0.94 or more, still more preferably 0.95 or more. The upper limit of the ratio (the transmittance of the cured product obtained by curing the adhesive at 23° C. for 1 hour at a wavelength of 650 nm/the transmittance of the cured product obtained by curing the curable component at 23° C. for 1 hour at a wavelength of 650 nm) is not particularly limited. The ratio (the transmittance of the cured product obtained by curing the adhesive at 23° C. for 1 hour at a wavelength of 650 nm/the transmittance of the cured product obtained by curing the curable component at 23° C. for 1 hour at a wavelength of 650 nm) may be 0.9999 or less. When the ratio (the transmittance of the cured product obtained by curing the adhesive at 23° C. for 1 hour at a wavelength of 650 nm/the transmittance of the cured product obtained by curing the curable component at 23° C. for 1 hour at a wavelength of 650 nm) is equal to or more than the lower limit, the visibility can be further improved.

The transmittance of the cured product obtained by curing the curable component at 23° C. for 1 hour at a wavelength of 650 nm is preferably 92% or more, more preferably 95% or more, still more preferably 98% or more. The upper limit of the transmittance of the cured product obtained by curing the curable component at 23° C. for 1 hour at a wavelength of 650 nm is not particularly limited. The transmittance of the cured product obtained by curing the curable component at 23° C. for 1 hour at a wavelength of 650 nm may be 99.9% or less. When the transmittance of the cured product obtained by curing the curable component at 23° C. for 1 hour at a wavelength of 650 nm is equal to or more than the lower limit, the visibility can be further improved.

The transmittance of the cured product obtained by curing the adhesive at 23° C. for 1 hour at a wavelength of 650 nm can be measured as follows.

The adhesive is applied in a thickness of 0.1 mm and cured at 23° C. for 1 hour to obtain a cured product. The transmittance at a wavelength of 650 nm is measured at 25° C. using the obtained cured product. The transmittance can be measured using, for example, a spectrophotometer (double beam spectrophotometer ("U-2910" manufactured by Hitachi High-Tech Science Corporation)). An integrating sphere can be used as a detector.

The transmittance of the cured product obtained by curing the curable component at 23° C. for 1 hour at a wavelength of 650 nm can be measured as follows.

The curable component is applied in a thickness of 0.1 mm and cured at 23° C. for 1 hour to obtain a cured product. The transmittance at a wavelength of 650 nm is measured at 25° C. using the obtained cured product. The transmittance can be measured using, for example, a spectrophotometer (double beam spectrophotometer ("U-2910" manufactured by Hitachi High-Tech Science Corporation)). An integrating sphere can be used as a detector.

Examples of the method for controlling the absolute value of the difference between the refractive index of the cured product obtained by curing the curable component at 23° C. for 1 hour and the refractive index of the silicone particles and the absolute value of the difference between the refractive index of the cured product obtained by curing the curable component at 23° C. for 1 hour and the refractive index of the coating particles or the refractive index of the coating layer in the preferable ranges include the following methods. A method in which a low refractive index filler (silica, fluororesin, or the like) is added to the curable component. A method in which the difference in refractive index at the interface between the curable component and the coating particles or coating layer is decreased.

The curable component is not particularly limited. Examples of the curable component include a thermosetting component, a photocurable component, and a room temperature curable component. When a thermosetting component or a photocurable component is used as the curable component, residual stress may be generated in the cured product of the adhesive (cured product of the curable component). Since the residual stress in the cured product of the adhesive (cured product of the curable component) may affect reliability and the like, it is necessary to decrease the residual stress as much as possible. Examples of the method for decreasing the residual stress in the cured product of the adhesive (cured product of the curable component) include a method in which a room temperature curable component is used as the curable component. The curable component is preferably a room temperature curable component. Room temperature is, for example, 25° C.

From the viewpoint of further improving the visibility, from the viewpoint of more effectively suppressing the generation of residual stress, and from the viewpoint of more effectively enhancing the heat resistance, the curable component preferably contains an acrylic resin or a silicone resin, and more preferably contains a silicone resin.

The acrylic resin may be a polymer of a (meth)acrylic compound. When the acrylic resin is obtained by polymerizing a (meth)acrylic compound, examples of the (meth) acrylic compound include the above-mentioned non-crosslinkable (meth)acrylic compounds and the above-mentioned crosslinkable (meth)acrylic compounds. The acrylic resin is preferably a room temperature curable resin.

The acrylic resin can be obtained by polymerizing the (meth)acrylic compound by a known method. Examples of this method include a method in which suspension polymerization is conducted in the presence of a radical polymerization initiator.

Examples of the acrylic resin include polymethyl methacrylate and polymethyl acrylate. From the viewpoint of further improving the visibility, from the viewpoint of more effectively suppressing the generation of residual stress, and from the viewpoint of more effectively enhancing the heat resistance, the acrylic resin is preferably polymethyl methacrylate.

The silicone resin may be an organopolysiloxane compound. The organopolysiloxane compound may have a hydroxyl group at the terminal or a vinyl group at the terminal. The silicone resin may be a polypropylene oxide having a methyldimethoxysilyl group. The silicone resin is preferably a room temperature curable resin.

The material of the silicone resin may be the material of the silicone particles described above. The silicone resin can be obtained by polymerizing the material of the silicone particles described above by a known method. Examples of this method include a method in which a polymerization reaction is conducted using a silane compound to form a siloxane bond.

Examples of the silicone resin include organopolysiloxane and polyorganosylsesquioxane. From the viewpoint of further improving the visibility, from the viewpoint of more effectively suppressing the generation of residual stress, and from the viewpoint of more effectively enhancing the heat resistance, the silicone resin is preferably organopolysiloxane.

In addition to the curable component and the optical bonding particles, the adhesive may contain a vinyl resin, a thermoplastic resin, a curable resin, a thermoplastic block copolymer, an elastomer, a solvent and the like. One kind of these components may be used singly, and two or more kinds thereof may be used concurrently.

Examples of the vinyl resin include a vinyl acetate resin, an acrylic resin, and a styrene resin. Examples of the thermoplastic resin include a polyolefin resin, an ethylene-vinyl acetate copolymer resin, and a polyamide resin. Examples of the curable resin include an epoxy resin, a urethane resin, a polyimide resin, and an unsaturated polyester resin. The curable resin may be a room temperature curable resin, a thermosetting resin, a photocurable resin, or a moisture-curable resin. The curable resin may be used in combination with a curing agent. Examples of the thermoplastic block copolymer include a styrene-butadiene-styrene block copolymer, a styrene-isoprene-styrene block copolymer, a hydrogenated styrene-butadiene-styrene block copolymer, and a hydrogenated styrene-isoprene-styrene block copolymer. Examples of the elastomer include a styrene-butadiene copolymer rubber and an acrylonitrile-styrene block copolymer rubber.

Examples of the solvent include water and an organic solvent. An organic solvent is preferable because it can be easily removed. Examples of the organic solvent include alcohol compounds such as ethanol, ketone compounds such as acetone, methyl ethyl ketone and cyclohexanone, aromatic hydrocarbon compounds such as toluene, xylene and tetramethylbenzene, glycol ether compounds such as cellosolve, methyl cellosolve, butyl cellosolve, carbitol, methyl carbitol, butyl carbitol, propylene glycol monomethyl ether, dipropylene glycol monomethyl ether, dipropylene glycol diethyl ether and tripropylene glycol monomethyl ether, ester compounds such as ethyl acetate, butyl acetate, butyl lactate, cellosolve acetate, butyl cellosolve acetate, carbitol acetate, butyl carbitol acetate, propylene glycol monomethyl ether acetate, dipropylene glycol monomethyl ether acetate and propylene carbonate, aliphatic hydrocarbon compounds such as octane and decane, and petroleum solvents such as petroleum ether and naphtha.

In addition to the curable component and the optical bonding particles, the adhesive may contain, for example, various additives such as a filler, an extender, a softener, a plasticizer, a polymerization catalyst, a curing catalyst, a colorant, an antioxidant, a thermal stabilizer, a light stabilizer, an ultraviolet absorber, a lubricant, an antistatic agent, and a flame retardant.

As a method for dispersing the optical bonding particles in the curable component, a conventionally known dispersion method can be used, and the dispersion method is not particularly limited. Examples of the method for dispersing the optical bonding particles in the curable component include the following methods. A method in which the optical bonding particles are added to the curable component and then the mixture is kneaded using a planetary mixer or the like for dispersion. A method in which the optical bonding particles are uniformly dispersed in water or an organic solvent using a homogenizer or the like, then this dispersion is added to the curable component, and the mixture is kneaded using a planetary mixer or the like for dispersion. A method in which the curable component is diluted with water, an organic solvent, or the like, then the optical bonding particles are added to the diluted curable component, and the mixture is kneaded using a planetary mixer or the like for dispersion.

The content of the optical bonding particles in 100% by weight of the adhesive is preferably 0.01% by weight or more, more preferably 0.1% by weight or more and preferably 80% by weight or less, more preferably 60% by weight or less, still more preferably 40% by weight or less, particularly preferably 20% by weight or less, most preferably 10% by weight or less. When the content of the optical bonding particles is equal to or more than the lower limit and less than or equal to the upper limit, the visibility can be further improved and the gap can be controlled with higher accuracy. When the content of the optical bonding particles is equal to or more than the lower limit and less than or equal to the upper limit, the optical bonding particles can more effectively exert the function as a spacer.

The content of the curable component in 100% by weight of the adhesive is preferably 10% by weight or more, more preferably 30% by weight or more, still more preferably 50% by weight or more, particularly preferably 70% by weight or more and preferably 99.99% by weight or less, more preferably 99.9% by weight or less. When the content of the curable component is equal to or more than the lower limit and less than or equal to the upper limit, the adhesive layer can be more favorably formed using the adhesive, and the optical bonding particles can more effectively exert the function as a spacer.

Display Device

The display device according to the present invention includes a first member, an image display element, which is a second member, and an adhesive layer, which bonds the first member and the second member together. In the display device according to the present invention, the adhesive layer is a cured product of an adhesive containing the above-described optical bonding particles and a curable component. The adhesive layer is preferably formed by a curing agent of the adhesive.

FIG. 5 is a cross-sectional view illustrating an example of a display device fabricated using the optical bonding particles according to the first embodiment of the present invention.

A display device 21 illustrated in FIG. 5 includes a first member 22, an image display element, which is a second member 23, and an adhesive layer 24, which bonds the first member 22 and the second member 23 together. The adhesive layer 24 is a cured product of an adhesive containing the optical bonding particles 1 and a curable component. Instead of the optical bonding particles 1, the optical bonding particles 11 for may be used.

The optical bonding particles 1 are present between the first member 22 and the second member 23, and constant spacing (gap) between the first member 22 and the second member 23 is maintained. By the optical bonding particles 1, the thickness of the adhesive layer 24 is constantly maintained and the thickness of the adhesive layer 24 is secured.

The thickness of the adhesive layer is preferably 30 μm or more, more preferably 50 μm or more and preferably 500 μm or less, more preferably 200 μm or less. When the thickness of the adhesive layer is equal to or more than the lower limit and less than or equal to the upper limit, the stress generated between the members can be relaxed more effectively and it is possible to more effectively prevent the adhesive layer from cracking and the adhesive layer from peeling off.

The method for fabricating the display device is not particularly limited. An example of the method for fabricating the display device includes a method in which the adhesive is disposed between the first member and the second member to obtain a stacked body and then the adhesive is cured.

The first member is preferably a transparent protective material. Examples of the material of the transparent protective material include glass and plastic. The transparent protective material is preferably a translucent material. The transparent protective material is preferably a material, which protects the surface of the image display element.

Examples of the display device include a liquid crystal display device and an in-vehicle display.

The present invention will be specifically described below by way of Examples and Comparative Examples. The present invention is not limited only to the following Examples.

Optical Bonding Particles 1

A mixture of 30 parts by weight of both-terminal acrylic silicone oil ("X-22-2445" manufactured by Shin-Etsu Chemical Co., Ltd.) and 3.3 parts by weight of vinyltrimethoxysilane ("KBM-1003" manufactured by Shin-Etsu Chemical Co., Ltd.) was prepared. Prepared was a solution A in which 0.5 parts by weight of 1,1,3,3-tetramethylbutylperoxy-2-ethylhexanoate (polymerization initiator, "PEROCTA 0" manufactured by NOF Corporation) was dissolved in this mixture. In 150 parts by weight of ion-exchanged water, 0.8 parts by weight of a 40% by weight aqueous solution of triethanolamine lauryl sulfate (emulsifier) and 80 parts by weight of a 5% by weight aqueous solution of polyvinyl alcohol (polymerization degree: about 2000, saponification degree: 86.5 mol % to 89 mol %, "GOHSENOL GH-20" manufactured by NIHON GOSEI KAKO Co., Ltd.) were mixed to prepare an aqueous solution B. The solution A was charged in a separable flask placed in a warm bath, and then the aqueous solution B was added. After that, it was confirmed that the particle diameter became a predetermined value. After that, the temperature was raised to 90° C., and polymerization was conducted for 9 hours. The entire amount of the particles after polymerization was washed with water by centrifugation, classified, and then freeze-dried to obtain silicone particles A. With regard to the obtained silicone particles A, the particle diameter was 101 μm and the CV value of the particle diameter was 10%.

Next, silica particles A ("QSG-100" manufactured by Shin-Etsu Chemical Co., Ltd.) were prepared as coating particles. The particle diameter of the prepared silica particles A was 110 nm.

In a 500 ml separable flask placed in a warm bath, 7.0 parts by weight of the obtained silicone particles A and 88.5 parts by weight of distilled water were charged, and 0.2 parts by weight of silica particles A previously dispersed in 4.0 parts by weight of methanol was gently dropped while irradiating the mixture with ultrasonic waves. After that, the mixture was stirred at room temperature for 6 hours to cover the surface of the silicone particles with silica particles. The entire amount of the particles after treatment was washed with water by centrifugation to obtain optical bonding particles 1.

Optical Bonding Particles 2

Prepared was a solution C in which 0.5 parts by weight of 1,1,3,3-tetramethylbutylperoxy-2-ethylhexanoate (polymerization initiator, "PEROCTA 0" manufactured by NOF Corporation) was dissolved in 30 parts by weight of both-terminal acrylic silicone oil ("X-22-2445" manufactured by Shin-Etsu Chemical Co., Ltd.). In 150 parts by weight of ion-exchanged water, 0.8 parts by weight of a 40% by weight aqueous solution of triethanolamine lauryl sulfate (emulsifier) and 80 parts by weight of a 5% by weight aqueous solution of polyvinyl alcohol (polymerization degree: about 2000, saponification degree: 86.5 mol % to 89 mol %, "GOHSENOL GH-20" manufactured by NIHON GOSEI KAKO Co., Ltd.) were mixed to prepare an aqueous solution B. The solution C was charged in a separable flask placed in a warm bath, and then the aqueous solution B was added. After that, it was confirmed that the particle diameter became a predetermined value. After that, the temperature was raised to 90° C., and polymerization was conducted for 9 hours. The entire amount of the particles after polymerization was washed with water by centrifugation, classified, and then freeze-dried to obtain silicone particles B. With regard to the obtained silicone particles B, the particle diameter was 102 μm and the CV value of the particle diameter was 11%.

Next, silica particles A ("QSG-100" manufactured by Shin-Etsu Chemical Co., Ltd.) were prepared as coating particles. The particle diameter of the prepared silica particles A was 110 nm.

In a 500 ml separable flask placed in a warm bath, 7.0 parts by weight of the obtained silicone particles B and 88.5 parts by weight of distilled water were charged, and 0.2 parts by weight of silica particles A previously dispersed in 4.0 parts by weight of methanol was gently dropped while irradiating the mixture with ultrasonic waves. After that, the mixture was stirred at room temperature for 6 hours to cover the surface of the silicone particles with silica particles. The entire amount of the particles after treatment was washed with water by centrifugation to obtain optical bonding particles 2.

Optical Bonding Particles 3

Silicone particles B obtained during the fabrication of the optical bonding particles 2 were prepared. Optical bonding particles 3 were obtained in the same manner as in the fabrication of optical bonding particles 2 except that the prepared silicone particles B were used and silica particles B ("QSG-30" manufactured by Shin-Etsu Chemical Co., Ltd.) were used as coating particles instead of silica particles A.

Optical Bonding Particles 4

Silicone particles A obtained during the fabrication of the optical bonding particles 1 were prepared. In a 500 ml separable flask placed in a warm bath, 7 parts by weight of the obtained silicone particles A, 85 parts by weight of distilled water, 7 parts by weight of methanol, and 0.2 parts by weight of 28% ammonia water were charged, the temperature was raised to 80° C. while performing stirring, and a reaction was conducted for 1 hour to promote the hydrolysis of the silanol groups introduced onto the surface, whereby a silica coating layer was formed. The obtained particles were washed with water by centrifugation to obtain optical bonding particles 4.

Optical Bonding Particles 5

Silicone particles B obtained during the fabrication of the optical bonding particles 2 were prepared. Optical bonding particles 5 were obtained in the same manner as in the fabrication of optical bonding particles 2 except that the prepared silicone particles B were used and silica particles C ("SEAHOSTAR KE-P50" manufactured by NIPPON SHOKUBAI CO., LTD.) were used as coating particles instead of silica particles A.

Optical Bonding Particles 6

A mixture of 30 parts by weight of both-terminal acrylic silicone oil ("X-22-2445" manufactured by Shin-Etsu Chemical Co., Ltd.) and 3.3 parts by weight of vinyltrimethoxysilane ("KBM-1003" manufactured by Shin-Etsu Chemical Co., Ltd.) was prepared. Prepared was a solution D in which 0.5 parts by weight of 1,1,3,3-tetramethylbutylperoxy-2-ethylhexanoate (polymerization initiator, "PEROCTA 0" manufactured by NOF Corporation) and parts by weight of silica particles A ("QSG-100" manufactured by Shin-Etsu Chemical Co., Ltd., particle diameter: 110 nm) were dispersed in this mixture. In 150 parts by weight of ion-exchanged water, 0.8 parts by weight of a 40% by weight aqueous solution of triethanolamine lauryl sulfate (emulsifier) and 80 parts by weight of a 5% by weight aqueous solution of polyvinyl alcohol (polymerization degree: about 2000, saponification degree: 86.5 mol % to 89 mol %, "GOHSENOL GH-20" manufactured by NIHON GOSEI KAKO Co., Ltd.) were mixed to prepare an aqueous solution B. The solution D was charged in a separable flask placed in a warm bath, and then the aqueous solution B was added. After that, it was confirmed that the particle diameter became a predetermined value. After that, the temperature was raised to 90° C., and polymerization was conducted for 9 hours. The entire amount of the particles after polymerization was washed with water by centrifugation, classified, and then freeze-dried to obtain silicone particles C. With regard to the obtained silicone particles C, the particle diameter was 80 μm and the CV value of the particle diameter was 10%.

Silicone particles C and silica particles D ("QSG-100" manufactured by Shin-Etsu Chemical Co., Ltd., particle diameter: 110 nm) as coating particles were prepared. A dispersion E in which 0.2 parts by weight of the silica particles D was dispersed in 4.0 parts by weight of methanol was prepared.

In a 500 ml separable flask placed in a warm bath, 7.0 parts by weight of the silicone particles C and 88.5 parts by weight of distilled water were charged, and the dispersion E was gently dropped while irradiating the mixture with ultrasonic waves. After that, the mixture was stirred at room temperature for 6 hours to cover the surface of the silicone particles C with the silica particles D. The entire amount of the particles after treatment was washed with water by centrifugation to obtain optical bonding particles 6.

Optical Bonding Particles 7

Silicone particles C were prepared. In a 500 ml separable flask placed in a warm bath, 7 parts by weight of the silicone particles C, 85 parts by weight of distilled water, 7 parts by weight of methanol, and 0.2 parts by weight of 28% ammonia water were charged, the temperature was raised to 80° C. while performing stirring, and a reaction was conducted for 1 hour to promote the hydrolysis of the silanol groups introduced onto the surface, whereby a silica coating layer was formed. The obtained particles were washed with water by centrifugation to obtain optical bonding particles 7.

Optical Bonding Particles A

Silicone particles B obtained during the fabrication of the optical bonding particles 2 were prepared. In a 500 ml separable flask placed in a warm bath, 7.0 parts by weight of the silicone particles B, 0.6 parts by weight of hexadecyltrimethylammonium bromide, 240 parts by weight of distilled water, and 120 parts by weight of methanol were charged. After the mixture was stirred at 40° C. for 1 hour, 2.1 parts by weight of divinylbenzene and 0.35 parts by weight of styrene were added to the mixture, the temperature was raised to 75° C., and stirring was performed for 0.5 hour. After that, 0.28 parts by weight of dimethyl 2,2'-azobis (isobutyrate) was added, and the mixture was stirred and reacted for 8 hours. The entire amount of the particles after polymerization was washed with water by centrifugation to obtain optical bonding particles A.

Optical Bonding Particles B

Silicone particles B obtained during the fabrication of the optical bonding particles 2 were prepared. In a 500 ml separable flask placed in a warm bath, 7.0 parts by weight of the silicone particles B, 0.6 parts by weight of hexadecyltrimethylammonium bromide, 240 parts by weight of distilled water, and 120 parts by weight of methanol were charged. After the mixture was stirred at 40° C. for 1 hour, 0.2 parts by weight of polytetramethylene glycol dimethacrylate and 2.2 parts by weight of methyl methacrylate were added to the mixture, the temperature was raised to 75° C., and stirring was performed for 0.5 hour. After that, 0.28 parts by weight of dimethyl 2,2'-azobis(isobutyrate) was added, and the mixture was stirred and reacted for 8 hours. The entire amount of the particles after polymerization was washed with water by centrifugation to obtain optical bonding particles B.

Example 1

Preparation of Adhesive

To a silicone adhesive ("LUMISIL 102" manufactured by Wacker Asahi Kasei Silicone Co., Ltd.), the optical bonding particles 1 were added so that the content in the obtained adhesive was 2% by weight, and uniformly dispersed by performing stirring using a planetary stirrer, whereby an adhesive was prepared.

Fabrication of Display Device

The obtained adhesive was filled in a syringe, and the adhesive was applied onto an image display element so as to have a thickness of 120 μm using a dispenser to form an adhesive layer, and then a transparent protective material was stacked on the formed adhesive layer to obtain a stacked body. The adhesive layer of the obtained stacked body was cured at 23° C. for 1 hour to bond the image display element and the transparent protective material together, whereby a display device was obtained.

Example 2

A display device was obtained in the same manner as in Example 1 except that the optical bonding particles 2 were used instead of the optical bonding particles 1 during the preparation of adhesive.

Example 3

A display device was obtained in the same manner as in Example 1 except that the optical bonding particles 3 were used instead of the optical bonding particles 1 during the preparation of adhesive.

Example 4

A display device was obtained in the same manner as in Example 1 except that the optical bonding particles 4 were used instead of the optical bonding particles 1 during the preparation of adhesive.

Example 5

A display device was obtained in the same manner as in Example 1 except that the optical bonding particles 5 were used instead of the optical bonding particles 1 during the preparation of adhesive.

Example 6

A display device was obtained in the same manner as in Example 1 except that the optical bonding particles 6 were used instead of the optical bonding particles 1 during the preparation of adhesive.

Example 7

A display device was obtained in the same manner as in Example 1 except that the optical bonding particles 7 were used instead of the optical bonding particles 1 during the preparation of adhesive.

Comparative Example 1

A display device was obtained in the same manner as in Example 1 except that the optical bonding particles A were used instead of the optical bonding particles 1 during the preparation of adhesive.

Comparative Example 2

A display device was obtained in the same manner as in Example 1 except that the optical bonding particles B were used instead of the optical bonding particles 1 during the preparation of adhesive.

Evaluation (1) Particle Diameter of Silicone Particles and Particle Diameter of Optical Bonding Particles With regard to the obtained silicone particles and optical bonding particles, the particle diameters of about 100,000 optical bonding particles or silicone particles were measured using a particle size distribution measuring apparatus ("Multisizer 4" manufactured by Beckman Coulter, Inc.) and the average value thereof was calculated.

(2) Particle Diameter of Coating Particles and Thickness of Coating Layer

When the obtained optical bonding particles included coating particles, the particle diameter of the coating particles was measured by observing the cross sections of the optical bonding particles under a transmission electron microscope (TEM) ("JEM2100" manufactured by JEOL Ltd.). The particle diameter of the coating particles was determined by calculating the average value of the particle diameters of ten arbitrary coating particles as the particle diameter of the coating particles for one optical bonding particle and calculating the average value of these particle diameters for ten arbitrary optical bonding particles.

When the obtained optical bonding particles included a coating layer, the thickness of the coating layer was measured by observing the cross section of the optical bonding particles under a transmission electron microscope (TEM) ("JEM2100" manufactured by JEOL Ltd.). The thickness of the coating layer was determined by calculating the average value of the thicknesses at arbitrary five positions of the coating layer as the thickness of the coating layer for one optical bonding particle and calculating the average value of these thicknesses for ten arbitrary optical bonding particles.

From the obtained results, the ratio of the particle diameter of the coating particles or the thickness of the coating layer to the particle diameter of the silicone particles was calculated.

(3) Refractive Index

With regard to the obtained silicone particles, coating particles, and optical bonding particles, the refractive index (R1) of the silicone particles, the refractive index (R2) of the coating particles, and the refractive index (R3) of the optical bonding particles were measured by a method conforming to JIS K7142: 2014 Plastics-Determination of refractive index Method B. The refractive index (R2) of the coating layer was measured by the method described above after being synthesized in the absence of silicone particles and dried. From the obtained results, the absolute value of the difference between the refractive index (R1) of the silicone particles and the refractive index (R2) of the coating particles or the refractive index (R2) of the coating layer was calculated.

A silicone adhesive ("LUMISIL 102" manufactured by Wacker Asahi Kasei Silicone Co., Ltd.), which was a curable component of the adhesive, was prepared. With regard to the prepared curable component, the refractive index (R4) of the cured product obtained by curing the curable component at 23° C. for 1 hour was measured by the method described above. From the obtained results, the absolute value of the difference between the refractive index (R4) of the cured product obtained by curing the curable component at 23° C. for 1 hour and the refractive index (R1) of the silicone particles and the absolute value of the difference between the refractive index (R4) of the cured product obtained by curing the curable component at 23° C. for 1 hour and the refractive index (R2) of the coating particles or the refractive index (R2) of the coating layer were calculated.

(4) Transmittance

With regard to the obtained adhesive, the transmittance (T1) of the cured product obtained by curing the adhesive at 23° C. for 1 hour at a wavelength of 650 nm was measured by the method described above. A silicone adhesive ("LUMISIL 102" manufactured by Wacker Asahi Kasei Silicone Co., Ltd.), which was a curable component of the adhesive, was prepared. With regard to the prepared curable component, the transmittance (T2) of the cured product obtained by curing the curable component at 23° C. for 1 hour at a wavelength of 650 nm was measured by the method described above. From the obtained results, the ratio (T1/T2) of the transmittance (T1) of the cured product obtained by curing the adhesive at 23° C. for 1 hour at a wavelength of 650 nm to the transmittance (T2) of the cured product obtained by curing the curable component at 23° C. for 1 hour at a wavelength of 650 nm was calculated.

(5) Coverage

With regard to the obtained optical bonding particles, the area (coverage) of the portion where the coating particles or the coating layer was present in 100% of the total surface area of the silicone particles was measured. The coverage was measured as follows.

Method for Measuring Coverage:

Observation under an electron microscope was performed, the projected area S1 per one obtained optical bonding particle and the circle-converted area S2 of the uncovered portion were calculated using image analysis software, and the coverage was determined by the following equation.

$$\text{Coverage (\%)} = (S1 - S2)/S1 \times 100$$

(6) Gap Controllability

With regard to the obtained ten display devices, the thickness of the adhesive layer was measured using a stereomicroscope ("SMZ-10" manufactured by Nikon Corporation), and the average thickness of the adhesive layer in the ten display devices was calculated. The gap controllability was judged according to the following criteria.

Criteria for Judgment in Gap Controllability

○○: Average thickness of adhesive layer is 108 μm or more and 132 μm or less

○: Average thickness of adhesive layer is 96 μm or more and less than 108 μm or more than 132 μm and 150 μm or less.

x: Average thickness of adhesive layer is less than 96 μm or more than 150 μm (7) Visibility With regard to the obtained display devices, it was visually evaluated whether or not reflection of outdoor light was generated. The visibility was judged according to the following criteria.

Criteria for Judgment in Visibility

○○: Reflection of outdoor light is rarely generated

○: Reflection of outdoor light is slightly generated but there is no problem in actual use x: Reflection of outdoor light is generated (8) Stress Relaxation Property Using a liquid tank type thermal shock tester ("TSB-51" manufactured by ESPEC), a hot-cold cycle test was conducted in which the process of holding the obtained display device at −40° C. for 5 minutes, raising the temperature to 150° C., holding the display device at 150° C. for 5 minutes, and then lowering the temperature to −40° C. was one cycle. The display device was taken out after 500 cycles.

The display device was observed under a stereomicroscope ("SMZ-10" manufactured by Nikon Corporation). It was observed whether or not cracking of the adhesive layer had occurred or whether or not peeling off of the adhesive layer had occurred. The stress relaxation property was judged according to the following criteria.

Criteria for Judgment in Stress Relaxation Property

○○: Cracking of adhesive layer has not occurred and peeling off of adhesive layer has not occurred ○: Cracking of adhesive layer has slightly occurred or peeling off of adhesive layer has slightly occurred but there is no problem in actual use x: Cracking of adhesive layer has occurred or peeling off of adhesive layer has occurred The results are presented in the following Tables 1 and 2.

TABLE 1

| | | | Example 1 | Example 2 | Example 3 | Example 4 | Example 5 |
|---|---|---|---|---|---|---|---|
| Silicone particle | Particle diameter | μm | 101 | 102 | 102 | 101 | 102 |
| | Refractive index of silicone particle (R1) | — | 1.413 | 1.424 | 1.424 | 1.413 | 1.413 |
| Coating particle or coating layer | Particle diameter of coating particle | nm | 110 | 110 | 32 | — | 486 |
| | Thickness of coating layer | nm | — | — | — | 35 | — |
| | Ratio of particle diameter of coating particle or thickness of coating layer to particle diameter of silicone particle | — | 0.001 | 0.001 | 0.0003 | 0.0003 | 0.0048 |
| | Refractive index of coating particle or refractive index of coating layer (R2) | — | 1.395 | 1.395 | 1.395 | 1.398 | 1.430 |
| | Absolute value of difference between R1 and R2 | — | 0.018 | 0.029 | 0.029 | 0.015 | 0.017 |
| Optical bonding particle | Particle diameter | μm | 101 | 102 | 102 | 101 | 102 |
| | Refractive index of optical bonding particle (R3) | — | 1.413 | 1.420 | 1.423 | 1.412 | 1.430 |
| | Coverage | % | 99 | 92 | 87 | 100 | 82 |
| Evaluation of adhesive | Refractive index of cured product obtained by curing curable component at 23° C. for 1 hour (R4) | — | 1.41 | 1.41 | 1.41 | 1.41 | 1.41 |
| | Absolute value of difference between R4 and R1 | — | 0.003 | 0.014 | 0.014 | 0.003 | 0.003 |
| | Absolute value of difference between R4 and R2 | — | 0.015 | 0.015 | 0.015 | 0.012 | 0.020 |
| | Transmittance of cured product obtained by curing adhesive at 23° C. for 1 hour at wavelength of 650 nm (T1) | % | 88.89 | 87.09 | 87.09 | 87.49 | 84.88 |
| | Transmittance of cured product obtained by curing curable component at 23° C. for 1 hour at wavelength of 650 nm (T2) | % | 89.79 | 89.79 | 89.79 | 89.79 | 89.79 |
| | Ratio (T1/T2) | — | 0.990 | 0.970 | 0.970 | 0.974 | 0.945 |
| Evaluation of display device | Gap controllability | | ○○ | ○○ | ○○ | ○○ | ○○ |
| | Visibility | | ○○ | ○○ | ○ | ○ | ○ |
| | Stress relaxation property | | ○○ | ○○ | ○○ | ○ | ○ |

TABLE 2

| | | | Example 6 | Example 7 | Comparative Example 1 | Comparative Example 2 |
|---|---|---|---|---|---|---|
| Silicone particle | Particle diameter | μm | 80 | 80 | 102 | 102 |
| | Refractive index of silicone particle (R1) | — | 1.41 | 1.41 | 1.424 | 1.424 |
| Coating particle or coating layer | Particle diameter of coating particle | nm | 110 | — | 102 | — |
| | Thickness of coating layer | nm | — | 35 | — | 82 |
| | Ratio of particle diameter of coating particle or thickness of coating layer to particle diameter of silicone particle | — | 0.0014 | 0.0004 | 0.001 | 0.0008 |
| | Refractive index of coating particle or refractive index of coating layer (R2) | — | 1.395 | 1.430 | 1.570 | 1.490 |
| | Absolute value of difference between R1 and R2 | — | 0.015 | 0.020 | 0.146 | 0.066 |
| Optical bonding particle | Particle diameter | μm | 100 | 100 | 102 | 103 |
| | Refractive index of optical bonding particle (R3) | — | 1.405 | 1.408 | 1.442 | 1.435 |
| | Coverage | % | 85 | 95 | 99 | 100 |
| Evaluation of adhesive | Refractive index of cured product obtained by curing curable component at 23° C. for 1 hour (R4) | — | 1.41 | 1.41 | 1.41 | 1.41 |
| | Absolute value of difference between R4 and R1 | — | 0 | 0 | 0.014 | 0.014 |
| | Absolute value of difference between R4 and R2 | — | 0.015 | 0.020 | 0.16 | 0.080 |
| | Transmittance of cured product obtained by curing adhesive at 23° C. for 1 hour at wavelength of 650 nm (T1) | % | 88.53 | 88.1 | 83.79 | 82.2 |
| | Transmittance of cured product obtained by curing curable component at 23° C. for 1 hour at wavelength of 650 nm (T2) | % | 89.79 | 89.79 | 89.79 | 89.97 |
| | Ratio (T1/T2) | — | 0.986 | 0.981 | 0.933 | 0.914 |
| Evaluation of display device | Gap controllability | | ○○ | ○○ | ○○ | ○○ |
| | Visibility | | ○○ | ○○ | x | x |
| | Stress relaxation property | | ○○ | ○○ | ○ | ○ |

EXPLANATION OF SYMBOLS

1, 1A, 11, 11A: Optical bonding particle
2: Silicone particle
3: Coating particle
4: Coating layer
5: Inorganic oxide particle
21: Display device
22: First member
23: Second member (image display element)
24: Adhesive layer

The invention claimed is:

1. Optical bonding particles comprising:

silicone particles; and coating particles or a coating layer disposed on a surface of the silicone particles, an absolute value of a difference between a refractive index of the silicone particles and a refractive index of the coating particles or a refractive index of the coating layer being 0.03 or less, the silicone particles including a plurality of inorganic oxide particles, at least a part of the inorganic oxide particles being present inside the silicone particles, a particle diameter of the coating particles or a thickness of the coating layer being 30 nm or more and 500 nm or less, and an area of a portion where the coating particles or the coating layer is present being 80% or more in 100% of a total surface area of the silicone particles.

2. The optical bonding particles according to claim 1, wherein a material of the coating particles or a material of the coating layer is silica or silicone resin.

3. The optical bonding particles according to claim 1, wherein a refractive index of the optical bonding particles is 1.40 or more and 1.43 or less.

4. The optical bonding particles according to claim 1, wherein a particle diameter of the optical bonding particles is 30 μm or more and 500 μm or less.

5. An adhesive comprising:

the optical bonding particles according to claim 1; and a curable component.

6. The adhesive according to claim 5, wherein an absolute value of a difference between a refractive index of a cured product obtained by curing the curable component at 23° C. for 1 hour and a refractive index of the silicone particles is 0.05 or less.

7. The adhesive according to claim 5, wherein an absolute value of a difference between a refractive index of a cured product obtained by curing the curable component at 23° C. for 1 hour and a refractive index of the coating particles or a refractive index of the coating layer is 0.03 or less.

8. The adhesive according to claim 5, wherein a ratio of a transmittance of a cured product obtained by curing the adhesive at 23° C. for 1 hour at a wavelength of 650 nm to a transmittance of a cured product obtained by curing the curable component at 23° C. for 1 hour at a wavelength of 650 nm is 0.94 or more.

9. A display device comprising:

a first member;

an image display element as a second member; and an adhesive layer bonding the first member and the second member together, the adhesive layer being a cured product of an adhesive containing optical bonding particles and a curable component, the optical bonding particles comprising:

silicone particles; and coating particles or a coating layer disposed on a surface of the silicone particles, an absolute value of a difference between a refractive index of the silicone particles and a refractive index of the coating particles or a refractive index of the coating layer being 0.03 or less, a particle diameter of the coating particles or a thickness of the coating layer being 30 nm or more and 500 nm or less, and an area of a portion where the coating particles or the coating layer is present being 80% or more in 100% of a total surface area of the silicone particles.

10. The display device according to claim 9, wherein the first member is a transparent protective material.

* * * * *